United States Patent Office

3,565,818
Patented Feb. 23, 1971

---

3,565,818
ENCAPSULATION PROCESS AND ITS PRODUCT
Robert Gordon Bayless, Yellow Springs, and Donald Day Emrick, Kettering, Ohio, assignors to The National Cash Register Company, Dayton, Ohio, a corporation of Maryland
No Drawing. Filed Jan. 29, 1968, Ser. No. 701,130
Int. Cl. A61k 9/04; B01j 13/02; B44d 1/02
U.S. Cl. 252—316
7 Claims

ABSTRACT OF THE DISCLOSURE

A process is disclosed for producing, en masse, in an aqueous manufacturing vehicle, minute capsules having walls comprising the product of a complexing reaction between poly(vinyl alcohol) and a slowly hydrolyzable alkylene glycol cyclic borate ester which product is a non-gelling product. The novel process utilizes an interfacial complexing reaction which is accomplished at the interface between a particle of intended capsule internal phase or core material and the aqueous liquid manufacturing vehicle. In a preferred embodiment of the invention, the slowly hydrolyzable cyclic borate ester is dissolved in the intended capsule internal phase material and the poly(vinyl alcohol) is dissolved in the aqueous manufacturing vehicle. When the intended internal phase material is dispersed in the manufacturing vehicle, a complexing reaction occurs at the particle-vehicle interface between the cyclic borate ester and the poly(vinyl alcohol) to create a capsule wall for the dispersed particle.

Optionally, the capsule walls, after creation, can be chemically treated with solutions of certain transition metal salts to harden the capsule walls and increase their rigidity.

BACKGROUND OF THE INVENTION

Field of the invention

This invention pertains to a process for producing, en masse, in an aqueous manufacturing vehicle, minute, novel, capsules having capsule wall material which comprises modified poly(vinyl alcohol). It more specifically relates to such a process and to the resulting capsule product wherein poly(vinyl alcohol) material, in the capsule walls, is complexed with alkylene glycol cyclic borate ester material and wherein the complexed materials are caused to emerge from two individual, liquid, solutions at an interface between the individual solutions, where one is dispersed in the other, to provide a capsule wall between liquid particles of capsule internal phase—one of the solutions, and the aqueous manufacturing vehicle—the other of the solutions.

The interfacial complexing reaction of this invention can be considered to be a result of a coacervation process, which implies that the complex is in a liquid state, although, in some embodiments, the coacervated material surrounding particles of capsule internal phase is rapidly solidified into hard capsule walls by hydrolysis of the alkylene glycol cyclic borate ester material into products which cross-link the poly(vinyl alcohol) content of the complex to provide a rigid gel structure. In the practice of this invention, it is believed that the reactions of: (1) poly(vinyl alcohol)-borate ester complex formation; (2) hydrolysis of the borate ester; and (3) reaction of hydrolysis product with poly(vinyl alcohol) probably occur, in that order, to provide solid-walled capsules; but the reactions may occur so rapidly that they are not apparently distinguishable, one from another, and on the other hand, the reactions may occur slowly.

In work performed prior to the time of this invention, it was found to be difficult to obtain localized volumes (such as is required for formation of capsule walls) of phase-separated poly(vinyl alcohol) complexes from an aqueous medium by using boric acid or other, similar borate compounds—it having been found that such boron-containing compounds cause immediate or very rapid "setting" of the entire mass of a poly(vinyl alcohol) solution to yield a rigid or jelly-like, continuous, single-phase mass. The boron-containing compounds utilized in practicing this invention, however, being of a kind different from those utilized in previous work, permit separation of localized volumes of poly(vinyl alcohol) complex in a liquid state and subsequent production of capsules.

Important aspects of this invention are considered to reside in the following observations: (a) a phase-separated liquid solution of a complex of poly(vinyl alcohol) and an alkylene glycol cyclic borate ester can be caused to be created at the interface between a liquid vehicle and a particle dispersed therein; (b) the complexed borate ester is hydrolyzed to provide boric acid (or a borate ion, depending on pH) to complex with and solidify the phase-separated, liquid solution of the poly(vinyl alcohol)-containing complex; and (c) capsule walls of the solidified, complex of poly(vinyl alcohol) are of good quality. A further important aspect of the invention resides in the discovery that certain transition metal salts, particularly those of vanadium, can be utilized to further solidify and chemically harden the poly(vinyl alcohol)/borate capsule wall material.

Description of the prior art

Encapsulation by means of liquid-liquid phase separation is well known—it being taught, among many other places, in United States Pats. Nos. 2,800,457 and 2,800,458, issued July 23, 1957, on the applications of Barrett K. Green and Lowell Schleicher and of Barrett K. Green, respectively, and assigned to the assignee herein. United States Pat. No. 2,800,457, teaches encapsulation by what is termed "complex coacervation" wherein at least two hydrophilic polymeric materials having opposite net electrical charges are caused to combine or complex from solution in an aqueous liquid manufacturing vehicle to yield an emergent liquid phase having a relatively high concentration of the complexed polymeric materials. The emergent liquid phase is utilized to form capsule walls about particles of intended capsule core materials dispersed in the manufacturing vehicle. In this complex coacervation, formation of the complex causes liquid-liquid phase separation because the liquid complex is partially immiscible with the manufacturing vehicle from which it emerged.

United States Pat. No. 2,800,458 teaches encapsulation by what is termed "simple coacervation" wherein a hydrophilic polymeric material is caused to emerge from solution, in an aqueous manufacturing vehicle, as a liquid, relatively high in concentration of the polymeric material. The emergent liquid phase is utilized to form capsule walls about particles of intended capsule core material dispersed in the equilibrium manufacturing vehicle. In this simple coacervation, the polymeric material is caused to emerge from solution as a separate liquid phase due to alteration of the manufacturing vehicle by addition of phase-separation-inducing material to make the polymeric material partially immiscible with said vehicle.

United States Pat. No. 2,969,330, issued Jan. 24, 1961, on the application of Carl Brynko and assigned to the assignee herein teaches a process for making capsules by interfacial polymerization. The above Brynko invention utilized a polymerization reaction having styrene as a monomeric starting material. There is no complex formation, nor is there a combination of reacting materials from both sides of the interface to yield a complex of polymeric material comprising at least two reacting materials in the Brynko patent.

United States Pat. No. 2,326,539, issued Aug. 10, 1943, on the application of Ernest Irany teaches reaction of poly-vinyl alcohol) and other aliphatic, hydroxyl-containing, polymeric materials with boric acid. A principal object of the invention taught by the above Irany patent is to provide finely-divided, free-flowing, thermoplastic resin material. According to the Irany patent, poly(vinyl alcohol) reacts with boric acid to form a complex of borated poly(vinyl alcohol) which, when dried, is completely pulverizable. It is stated therein that boric acid can be removed from the dried, borated, poly(vinyl alcohol) by washing the complex with a solution of acetone and water, thereby obtaining material having the same chemical composition as that of the originally used poly(vinyl alcohol). The intended reaction product of the above Irany patent is a brittle, pulverizable, resin material, the boron-containing reactant is boric acid, and there is no indication in the Irany patent that localized volumes of a separated liquid phase or a fluid gel can be produced by an interfacial complexing reaction of poly (vinyl alcohol) with boric acid.

United States Pat. No. 3,324,065, issued June 6, 1967, on the application of Andrew Pierce teaches reaction, in an aqueous medium, of poly(vinyl alcohol) with water soluble boron compounds—a boric acid being preferred. The reaction product of the above Pierce invention forms a single-phase, tacky, liquid which is used as an adhesive material having improved adhesive characteristics over other poly(vinyl alcohol)-containing adhesive material. The adhesive material of Pierce includes a non-boron-containing "water soluble gelation retarder," and there is no indication that a phase separation or interfacial reaction would be possible, even if such phase-separation were desirable.

"Some Aspects of Hydrocolloid Gelation" by R. E. Schachat and L. Z. Raymond in Advances in Chemistry Series, No. 25 (Physical Functions of Hydrocolloids), pages 11–24, published 1960 by American Chemical Society, describes gelation of aqueous solutions of poly-(vinyl alcohol) by materials such as borax and boric acid, but there is no teaching of interfacial complexing relating to formation of a poly(vinyl alcohol) borate complex from the poly(vinyl alcohol) solutions.

United States Pat. No. 3,067,192, issued Dec. 4, 1962, on the application of Donald D. Emrick, one of the inventors herein, teaches a method for preparation of organic-liquid soluble borates of polysaccharides having two adjacent cis-hydroxyl groups. Such borated polysaccharides are intended for use as motor oil additives and there is no indication in the United States Pat. No. 3,067,192 of their use as gelling or complexing agents for poly(vinyl alcohol) in aqueous solution. A reason for citing the above Emrick patent herein is that the patent discloses alkylene glycol cyclic borate esters of the same general type utilized in practice of the instant invention. Methods for preparing alkylene glycol cyclic borate esters or their monohydric alcohol derivatives are not considered to be a part of the instant invention; nor are the alkylene glycol cyclic borate esters themselves.

Although not prior art, United States patent application Ser. No. 701,127, filed Jan. 29, 1968, on the same date herewith in the name of Robert G. Bayless and Donald D. Emrick, the inventors herein and assigned to the assignee herein, teaches a method for preparing capsules having walls which include poly(vinyl alcohol) which has been complexed with an alkylene glycol cyclic borate ester. The complexing reaction disclosed in that application, however, is performed wholly in aqueous solution and, in order to form capsule walls, a phase-separation-inducing agent must be added to the system to cause a liquid-liquid phase separation of a liquid solution relatively rich in the capsule wall material of poly-(vinyl alcohol)/borate ester complex. If it is desired or required to isolate the capsules made by practicing the invention of the above-mentioned patent application Ser. No. 701,127, the capsule wall material can be hardened by some further treatment to provide chemical cross-linked capsule walls. Moreover, types of cyclic borate ester materials preferably used in practicing that invention are different, especially in solubility and water-reactivity, from the preferred types utilized in practice of the present invention.

United States patents numbered 3,258,422, issued June 28, 1966; 3,264,245, issued Aug. 2, 1966; and 3,265,657, issued Aug. 9 1966 all on the applications of Harold Sinclair, teach formation of a rigid gel from a solution of poly(vinyl alcohol) by treatment of the poly(vinyl alcohol) with metallic ions such as vanadium, titanium, or chromium. The rigid gels formed by the above Sinclair inventions are of a gross nature, that is, a continuous, mass of poly(vinyl alcohol) solution is homogeneously, rigidly, gelled as a single phase, and the formation of capsules is not taught.

SUMMARY OF THE INVENTION

In past attempts to manufacture individual, minute capsules, en masse, from a liquid manufacturing vehicle, wherein the capsule walls included poly(vinyl alcohol), it had been found difficult to provide the poly(vinyl alcohol) in a state or condition appropriate for encapsulation. While the prior art teaches several methods for gelling solutions of poly(vinyl alcohol), there is a lack of teaching in the art pertaining to formation of complexed films of poly(vinyl alcohol) at the interface between a liquid vehicle and a dispersed phase therein, which films serve as capsule walls.

The term "poly(vinyl alcohol)" as used herein is to be understood as referring to polymeric material in which at least 50 percent, by weight, thereof is composed of vinyl alcohol constituent. The term refers to polymeric materials all of which include vinyl alcohol constituents and also to polymeric material containing not only vinyl alcohol constituents but also vinyl acetate (and/or propionate and/or butyrate) constituents providing that the vinyl alcohol constituents make up at least 50 percent, by weight, of the polymeric material. The poly(vinyl alcohol) most often used in practice of this invention is any commercial variety and is up to this time the hydrolysis product of poly(vinyl acetate). Poly(vinyl alcohol) representing poly(vinyl acetate) which has been hydrolyzed to an extent of 75 to 99 or more percent, by weight, is preferably used, although poly(vinyl alcohol) having a lower degree of hydrolysis can be used.

Characteristics of films made from poly(vinyl alcohol)-containing materials with respect to liquid and gas diffusion or permeation through the films are such that capsule walls can be prepared which are highly impermeable. Also, poly(vinyl alcohol)—being a hydrophilic polymeric material—shares with other hydrophilic polymeric materials substantial insolubility in common "oily" organic solvents.

The novel process provides capsules which exhibit very little inter-capsule adhesion during final manufacturing steps of capsule wall drying. It is, therefor, believed that the novel process greatly simplifies the heretofore rather complex and expensive capsule manufacturing steps of isolating the capsules from a manufacturing vehicle and drying the capsule walls.

An object of this invention is to provide superior process for preparing, en masse, from a liquid manufacturing vehicle, minute capsules having poly(vinyl alcohol) as one component of the capsule walls. A further object of this invention is to provide a capsule made by the above process wherein the capsule wall material comprises a complex combination of materials comprising poly(vinyl alcohol) and an alkylene glycol cyclic borate ester wherein the alkylene glycol portion of said cyclic borate ester is a 1,3- or 2,4-dihydroxy substituted glycol.

A further and more specific object of this invention is to provide such a process wherein a complex of poly(vinyl alcohol) and alkylene glycol cyclic borate ester material or one of the hydrolysis products of borate ester material is produced at an interface between an aqueous liquid manufacturing vehicle and included particles of intended capsule internal phase, said complex becoming capsule wall material enwrapping the particles to produce capsules. A further and more specific object of this invention is to provide such a process wherein the poly(vinyl alcohol) is originally in solution in the manufacturing vehicle and the alkylene glycol cyclic borate ester is originally in soution in the intended internal phase material and wherein the poly(vinyl alcohol) and the boron-containing material come into reactive contact and form a complex at the interface between the manufacturing vehicle and particles of intended capsule internal phase dispersed therein.

The novel process of this invention, stated broadly, includes the steps of:

(a) establishing an aqueous liquid manufacturing vehicle, including poly(vinyl alcohol) material as one component of an intended capsule wall material;

(b) adding to the system, once established, intended capsule core material, substantially insoluble in the manufacturing vehicle. The core material has incorporated therein an alkylene glycol cyclic borate ester material and the capsule wall materials are capable of complexing to yield a substantially insoluble complex of materials at the manufacturing vehicle-capsule core material interface to form the walls of capsules; and, optionally, (c) treating the so-formed capsules by an aqueous solution of a transition metal salt to cross-link the poly(vinyl alcohol)/alkylene glycol cyclic borate complex and render it more water insoluble and less water-swellable.

With the foregoing discussion and objects of the invention in mind, the invention will now be explained and exemplified in detail, from which detailed explanation and the appended claims, further objects and features of the invention will become apparent to those skilled in the art to which this invention pertains.

Material contained by capsule walls of this invention, i.e., the selected capsular internal phase or core material, need only be (a) capable of dissolving one of the capsule wall material components, and (b) substantially water-insoluble. Aside from the above considerations, the composition of the material to be contained is relatively unimportant for successful practice of the invention provided that it does not interact with the intended capsule wall material or with other encapsulating-system components to the detriment of the novel process. A few of the materials which can be utilized as capsule internal phases include, among a multitude of others: water insoluble or substantially water insoluble liquids such as olive oil, fish oils, vegetable oils, sperm oil, mineral oil, xylene, benzene, toluene, kerosene, chlorinated biphenyl, and methyl salicylate; water insoluble metallic oxides and salts; fibrous materials such as cellulose or asbestos; water insoluble synthetic polymeric materials; minerals, pigments; glasses; elemental materials including solids, liquids and gases; flavors; fragrances; reactants; biocidal compositions; physiological compositions; fertilizer compositions; and the like. Of course, solid internal phase materials can be encapsulated as dispersed components in a substantially water-insoluble liquid. The capsule product of this invention finds particular utility in containing organic liquid solutions of phthalide-types and other types of latent, uncolored, dyes, such as 3,3-bis(4-dimethylaminophenyl)-6-dimethyl-aminophthalide (commonly known as crystal violet lactone), in their uncolored state—the combination of materials in the encapsulating system of this invention being substantially unreactive with these types of dye materials.

The capsule walls provided by this invention are a viscous, semi-solid or gelled, complex of poly(vinyl alcohol) and alkylene glycol cyclic borate ester compounds which become solidified further on continued contact with the aqueous manufacturing vehicle—the solidification thought to be because of hydrolysis of a portion of the alkylene glycol cyclic borate ester materials of the capsule walls into alkylene glycol and boric acid which boric acid further reacts with the remaining poly(vinyl alcohol)-containing capsule wall material, however, the exact nature of these reactions is not fully understood.

It should, however, be understood that the interfacially formed complex of this invention is not an immediately-formed, rigid, complex such as might be expected from a reaction between poly(vinyl alcohol) in aqueous solution with borate anions. The complex of this invention is produced in the interface region between the manufacturing vehicle and the capsule core particles and is a product of the reaction between poly(vinyl alcohol) and a cyclic borate ester which, after a time and by a series of further reactions which, as said, is not entirely understood, becomes, after a time, solidified to yield capsule wall material of high quality with regard to impermeability.

The alkylene glycol cyclic borate ester of this invention is prepared by reaction of a beta-alkylene glycol with boric acid or a borate, e.g.,

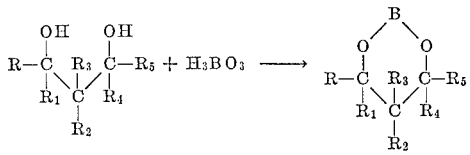

wherein R, $R_1$, $R_2$, $R_3$, $R_4$, and $R_5$ can be either hydrogen atoms or alkyl groups having from one to seven, and preferably one to two carbon atoms, and, further, one and preferably two of the above R groups are alkyl groups. For use in this invention, a 1,3- or 2,4-beta-alkylene glycol is chosen so that the alkylene glycol cyclic borate ester will be soluble in the intended capsule internal phase material and so that the boron-containing ring will have six members. It is well-known that six-membered rings provide a degree of stability against ring cleavage and such a structure has therefore been chosen for use herein to provide a cyclic borate ester material which, while hydrolyzable, presents some resistance to hydrolysis. The unhydrolyzed alkylene glycol cyclic borate ester material is capable of complexing with only one hydroxyl group from a poly(vinyl alcohol) molecule and, further, cross-linking will not occur until the cyclic borate ester material is at least partially hydrolyzed.

Various types of cyclic borate esters differ as to amount of boron-containing constituent and the manner in which it is included in the borate ester molecules. Discussion of the variety of borate ester types can be facilitated by use of numerical ratios such as 1:1, 2:2, 3:2, etc., to indicate the ratio of glycol groups to boron constituents in a borate ester molecule. Although the reaction is not fully understood, an alkylene glycol cyclic borate ester having a ratio of 2:2 is preferred for use in this invention. It is believed that the 2:2 cyclic borate ester materials are much more reactive to the purpose of this invention than are the 1:1 borate esters and, further, that they undergo hydrolysis or alcoholysis with the hydroxyls at the poly(vinyl alcohol) in the course of the interfacial complexing reaction of this invention, thereby providing a number of boric acid ligands sufficient to rapidly produce the desired, viscous, semi-solid or gelled complex.

The previously identified U.S. patent application Ser. No. 701,127, relates to capsule manufacture by liquid-liquid phase separation of a vehicle solution which has capsule core material suspended therein and, in the practice of that invention, it was found that the type of cyclic borate esters having a 1:1 glycol to boron constituent ratio was preferable to provide capsules of good quality.

The complex combination of materials which is produced by the action of the alkylene glycol cyclic borate ester of this invention on poly(vinyl alcohol) is viscous and gelled and is formed in a localized volume at the interface between particles of intended capsule core entities and the manufacturing vehicle. On some occasions, however, when the interfacially-formed complex is not initially sufficiently cross-linked to be highly viscous, it is helpful to add to the encapsulating system materials which are commonly designated to be phase-separation-inducing agents. In the instance of this invention, the materials obviously do not induce phase separation but they do serve to prevent dissolving of the complex in the manufacturing vehicle to allow solidification of the complex material in situ. Such so-called phase-separation-inducing agents are usually either water soluble polymeric materials such as gum arabic or water soluble inorganic salts such as ammonium sulfate, sodium sulfate, or magnesium sulfate. A combination of so-called phase-separation-inducing agents can, of course, be utilized and they can be added to the manufacturing vehicle at any time during the capsule manufacturing process. As noted previously, the partially unhydrolyzed alkylene glycol cyclic borate ester present in the capsule walls by its being partially complexed with poly(vinyl alcohol) may, after a time, be further hydrolyzed into boric acid and alkylene glycol and, thereby, form a relatively rigid poly(vinyl alcohol)/boric acid complex—the degree and rate of this rigidization increasing with increase in pH above about 4. Thus, the capsules originally formed will "self-harden" by further hydrolysis which occurs after capsule wall formation in a manufacturing vehicle having appropriate conditions. The hydrolysis reaction can be controlled, to some degree, by careful adjustment of such factors as temperature of the system, pH of the manufacturing vehicle, concentration of the poly(vinyl alcohol) and cyclic borate ester material in the system, and relative amounts of poly(vinyl alcohol) and borate ester materials in the system. Of course, the kind of alkylene glycol used in preparing the borate ester and the type of borate ester prepared also bear a relation to the rapidity and degree of hydrolysis and, therefore, to the rapidity and degree of further rigidification of the poly(vinyl alcohol)-containing capsule walls. The more alkyl branching or "buttressing" groups adjacent to the six-membered ring structure of the cyclic borate ester, the more stable will be the cyclic borate structure to hydrolysis. The alkylene glycols used in the manufacture of the above cyclic borate esters are 1,3- or 2,4-dihydroxy beta-substituted glycols having at least one alkyl branch and a total of at least 5 carbon atoms.

If it is desired or required that the capsule walls be hardened to a rigid state, they can be treated by an aqueous solution of vanadyl sulfate or other transition metal salt by adding an aqueous solution of the salt to the agitating system of capsules in the manufacturing vehicle and then adjusting the pH of the manufacturing vehicle to yield optimum conditions for chemical reaction between the poly(vinyl alcohol) and the transition metal ions. The above method for treating capsule wall materials which comprises reacting poly(vinyl alcohol) with a salt of a transition metal such as vanadium is not considered to be a part of the invention herein—it being taught in U.S. patent application Ser. No. 701,129, filed on the same date herewith in the name of Donald D. Emrick, and assigned to the assignee herein. The above Emrick patent application is a continuation-in-part of the U.S. patent application Ser. No. 586,943, filed Oct. 17, 1966.

It should be understood that the capsules need not have dried walls or even be separated from a liquid vehicle prior to their use. If it is desired or required for some intended purpose, the capsule product of this invention can be supplied as a slurry of capsules in a liquid carrier, either the manufacturing vehicle or not, as for use in a paper-coating composition, a paint, an insecticide composition, or the like—such uses being well-known and obvious to persons skilled in the pertinent arts.

DESCRIPTION OF THE PREFERRED EMBODIMENTS

Example 1

In this example, capsules were prepared wherein the capsule wall material was a combination of two types of poly(vinyl alcohol) each complexed interfacially with a 2:2-type of alkylene glycol cyclic borate ester. The cyclic borate ester utilized in this example is bis(2-methyl-2,4-pentandiol) diborate. Dioctyl phthalate, was used as the capsule internal phase. In this example, so-called phase-separation-inducing materials were used to assure that the interfacially formed capsule walls maintained their integrity while being hardened by the optional chemical cross-linking treatment using an aqueous solution of vanadyl sulfate.

Into a vessel having a capacity of about 1500 milliliters and equipped for agitation were placed 200 milliliters of 11 percent, by weight, aqueous gum arabic solution (having a pH of 4.4), 10 grams of urea to act as an anti-aggregation agent, and 150 milliliters of 5 percent, by weight, aqueous poly(vinyl alcohol) solution. The poly (vinyl alcohol) solution was prepared as follows: 1.5 grams of about 86,000-molecular weight poly(vinyl alcohol) characterized by having a viscosity of about 28 to about 32 centipoises in a 4 percent, by weight, aqueous solution at 20 degrees centigrade, and by being 99 to 100 percent hydrolyzed (such as the material designated as "Elvanol 71–30" sold by E. I. du Pont de Nemours and Co., Wilmington, Del., United States of America) and 6.0 grams of about 125,000-molecular weight poly(vinyl alcohol) characterized by having a viscosity of about 35 to about 45 centipoises in a 4 percent, by weight, aqueous solution at 20 degrees centigrade and by being 87 to 89 percent hydrolyzed (such as the material designated as "Elvanol 50–42" sold by E. I. du Pont de Nemours and Co., Wilmington, Del., United States of America) were dissolved in enough hot water to make a total volume of 150 milliliters of solution. To the above, agitating, system was added in dropwise fashion over a duration of about 20 minutes, a solution of 5 milliliters of bis(2-methyl-2,4-pentanediol) diborate dissolved in 45 milliliters of dioctyl phthalate—the initial capsule internal phase. The diborate was prepared by reaction of 2-methyl-2,4-pentanediol (sometimes named hexylene glycol) with boric acid according to the technique taught by Samuel M. Darling et al., in United States Pat. No. 2,741,548, issued Apr. 10, 1956. The diborate material readily reacts with moisture and, for that reason, the diborate solution in dioctyl phthalate was protected from atmospheric moisture until it was used. The agitation was adjusted to yield liquid particles of the prepared dioctyl phthalate solution of 500 to 1000 microns in diameter and the temperature of the system was maintained at approximately 25 degrees centigrade. Particles of the dioctyl phthalate internal phase solution which were dispersed in the agitating manufacturing vehicle developed capsule walls of gelled poly-(vinyl alcohol)/borate complex formed at the interface of the manufacturing vehicle and the particles. The gelled capsule walls in this example were relatively highly swollen and to shrink the capsule wall material prior to chemical hardening, 150 milliliters of 15 percent, by weight, aqueous sodium sulfate solution was added in dropwise fashion over a duration of about 45 minutes. Following the addition of sodium sulfate, 100 milliliters more of the sodium sulfate solution was added, over a duration of about 35 minutes, which solution additionally had 5 grams of vanadyl sulfate dihydrate dissolved in it. Five milliliters of concentrated aqueous ammonia was then dissolved in 95 milliliters more of the sodium sulfate solution and was slowly added to the system to optimize conditions for the capsule wall hardening treatment by raising the pH. After the system had agitated for about 20 hours, the capsules were separated from the manufacturing vehicle, were washed twice with cold water, and were spread on an absorbent surface to dry in the laboratory environment (about 25 degrees centigrade and 50 percent relative humidity). The capsule product was free-flowing, apparently dry, individual capsules which yielded liquid dioctyl phthalate when ruptured.

Example 2

The same procedure as above in Example 1 was followed utilizing the same materials as to kind, concentration and amount except that xylene was substituted for the dioctyl phthalate as capsule internal phase. It is believed that the 2:2-type of cyclic borate ester is useful in practice of this invention utilizing interfacial complexing because the 2:2-type of material more readily undergoes hydrolysis or alcoholysis and provides borate ester material in amounts greater than would normally be available in aqueous systems simply because of rather limited aqueous solubility of the 1:1-type of borate ester material. The 1:1 cyclic borate ester exhibits only about 2 percent, by weight, solubility in water and it is believed that hydrolysis or alcoholysis of the 2:2-type of material in a localized, interfacial, volume provides a concentration of borate ester much higher than 2 percent, therefore, providing a semi-solid or gelled, interfacially formed, capsule wall material.

Example 3

This example was conducted to demonstrate a method for "finishing" capsules by use of alkylene glycol cyclic borate esters. In this example, the capsules of Example 1—vanadyl sulfate treated, but not dried—were washed with 400 milliliters of an aqueous solution containing 4 grams of vanadyl sulfate and 4 grams of bis(2-methyl-2,4-pentanediol) diborate (2:2) prior to a final wash with cold water. The procedure of this example provides a capsule product which has capsule walls which are still more rigid than the capsule walls of Example 1. The capsule product of this example appears to have quality equivalent to or better than the capsule product of Example 1 for strength, and the wet capsule walls are even more easily dried than the wet capsule walls of Example 1.

Example 4

This example had the same purpose as Example 3. In this example, the capsules of Example 2—vanadyl sulfate treated, but not dried—were washed with 400 milliliters of an aqueous solution containing 4 grams of sodium tetraborate decahydrate. The capsule product was substantially identical, in appearance, to that of Example 3.

Example 5

In this example, an alkylene glycol cyclic borate ester of the type having a glycol to boron ratio of 3:2 was utilized. This particular cyclic borate ester was substantially insoluble in water and was provided to the interface between the aqueous, poly(vinyl alcohol)-containing, manufacturing and the particles of capsule internal phase by being dissolved in the capsule internal phase.

Into a vessel having a capacity of about 1500 milliliters and equipped for agitation, were placed 200 milliliters of 11 percent, by weight, aqueous solution of gum arabic and 150 milliliters of aqueous poly(vinyl) alcohol solution. The poly(vinyl alcohol) solution used was as specified in Example 1. To the above, agitating, system was added, in dropwise fashion over a duration of about 20 minutes, a solution of 5 milliliters of tris(2-ethyl-1,3-hexanediol) diborate (3:2) dissolved in 45 milliliters of dioctyl phthalate—the capsule internal phase. The agitation was adjusted to yield liquid particles of the dioctyl phthalate-diborate solution of 500 to 1200 microns in diameter and the tempreature was maintained at approximately 25 degrees centigrade. Particles of the internal phase solution which were dispersed in the agitating manufacturing vehicle developed capsule walls of gelled poly(vinyl alcohol) alkylene glycol cyclic borate ester complex formed at the interface between the manufacturing vehicle and the particles. As in Example 1, the gelled capsule walls were relatively highly swollen and to shrink the capsule wall material prior to chemical hardening, 260 milliliters of 15 percent, by weight, aqueous sodium sulfate solution was added to the system in a dropwise fashion. Following the addition of sodium sulfate, 100 milliliters more of the sodium sulfate solution was added over a duration of about 35 minutes, which solution, additionally, had 5 grams of vanadyl sulfate dihydrate dissolved in it. Five milliliters of concentrated aqueous ammonia were then dissolved in 95 milliliters more of the sodium sulfate solution and the solution was slowly added to the system to raise the pH for the capsule wall hardening treatment. After the system had agitated for about an additional 30 minutes, the capsules were separated from the manufacturing vehicle, were washed first with 400 milliliters of an aqueous solution containing 4 grams of vanadyl sulfate and 4 grams of bis(2-methyl-2,4-pentanediol) diborate (2:2) and then with 400 milliliters of cold water, and were spread on an absorbent surface to dry in the laboratory environment.

Example 6

This example was conducted to demonstrate that capsules can be made according to the teaching of this invention without use of so-called phase-separation-inducing agents. About 1000 milliliters of poly(vinyl alcohol) solution having the poly(vinyl alcohol) kinds and concentrations as specified in Example 1 were placed into a vessel with a capacity of about 1500 milliliters. The poly(vinyl alcohol) solution was agitated and droplets of a 5 percent, by volume, solution of bis(2-methyl-2,4 pentanediol) diborate (2:2) in dioctyl phtalate were slowly added. After about 1 hour, capsules had completely formed having semi-solid or gelled walls and the capsule walls were hardened by immersing them in a water-miscible dehydrating solvent—in this case acetone. Methanol, ethanol, dioxane or other well-known materials could have been used in place of acetone.

What is claimed is:

1. A process for producing minute capsules, en masse, comprising the steps of:
   (a) dispersing, in an agitating aqueous manufacturing vehicle comprising poly(vinyl alcohol), particles of a substantially water insoluble liquid material to be encapsulated which comprises, in solution, an alkylene glycol cyclic borate ester wherein the alkylene glycol cyclic borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms; which ester is reactive to complex with the poly(vinyl alcohol); and
   (b) maintaining the agitation for a time sufficient to permit reaction between the poly(vinyl alcohol) and the alkylene glycol cyclic borate ester at the interface of the dispersed particles and the manufacturing vehicle, said reaction producing capsule walls of complexed poly(vinyl alcohol) and alkylene glycol cyclic borate ester about the individual dispersed particles of capsule core entities.

2. The capsule product of claim 1.

3. The process of claim 1 wherein the alkylene glycol cyclic borate ester is a reaction product of a reaction between boric acid and at least one glycol taken from the group consisting of 1,3-dihydroxy substituted glycol having at least one alkyl branch and a total of at least 5 carbon atoms and 2,4-dihydroxy substituted glycol having at least one alkyl branch and a total of at least 5 carbon atoms.

4. An agitating two-phase system consisting essentially of a continuous first phase of an aqueous liquid manufacturing vehicle having poly(vinyl alcohol) dissolved therein and, further, having dispersed therein particles to form a discontinuous second phase of substantially water-insoluble intended capsule core entities of a solution including alkylene glycol cyclic borate ester wherein the alkylene glycol cyclic borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms; which alkylene glycol cyclic borate ester is reactive to complex with poly(vinyl alcohol) at the interface of the dispersed particles.

5. The system of claim 4 wherein the alkylene glycol cyclic borate ester is a reaction product of a reaction between boric acid and at least one glycol taken from the group consisting of 1,3-dihydroxy substituted glycol having at least one alkyl branch and a total of at least 5 carbon atoms and 2,4-dihydroxy substituted glycol having at least one alkyl branch and a total of at least 5 carbon atoms.

6. In a process for manufacturing minute capsules, en masse, comprising the steps of dispersing in an agitating aqueous manufacturing vehicle comprising a polymeric material, particles of a substantially water insoluble material to be encapsulated which comprises, in solution, a complexing agent reactive to complex with the polymeric material and maintaining the agitation for a time sufficient to permit reaction between the polymeric material and the complexing agent at the interface of the dispersed particles and the manufacturing vehicle, to produce capsule walls of complexed polymeric material and complexing agent about the individual dispersed particles of capsule core entities; the improvement wherein the polymeric material is poly(vinyl alcohol) and the complexing agent is an alkylene glycol cyclic borate ester wherein the alkylene glycol cyclic borate ester is a product of reaction between boric acid or a borate and at least one alkylene glycol selected from the group consisting of 1,3-glycols having at least one alkyl branch and a total of at least 5 carbon atoms and 2,4-glycols having at least one alkyl branch and a total of at least 5 carbon atoms.

7. The process of claim 6 wherein the alkylene glycol cyclic borate ester is a reaction product of a reaction between boric acid and at least one glycol taken from the group consisting of 1,3-dihydroxy substituted glycol having at least one alkyl branch and a total of at least 5 carbon atoms and 2,4-dihydroxy substituted glycol having at least one alkyl branch and a total of at least 5 carbon atoms.

References Cited

UNITED STATES PATENTS

| 2,741,548 | 4/1956 | Darling et al. | 44—69 |
| 2,753,288 | 7/1956 | Visscher | 424—33X |
| 2,993,837 | 7/1961 | Millar et al. | 424—33 |
| 3,270,100 | 8/1966 | Jolkovski et al. | 252—316X |

RICHARD D. LOVERING, Primary Examiner

U.S. Cl. X.R.

71—64; 99—166; 106—308; 117—100; 260—29.6; 264—4; 424—33